3,590,027
PROCESS FOR PREPARING THYROCALCITONIN USING AN ACIDIC MIXTURE OF WATER AND A WATER-MISCIBLE ORGANIC SOLVENT
Edward L. Grinnan and Robert L. Wolen, Indianapolis, Ind., assignors to Eli Lilly and Company, Indianapolis, Ind.
No Drawing. Continuation-in-part of application Ser. No. 619,910, Mar. 2, 1967. This application May 16, 1969, Ser. No. 825,436
Int. Cl. C07c 103/52; C07g 7/100
U.S. Cl. 260—112
6 Claims

ABSTRACT OF THE DISCLOSURE

A novel process for obtaining thyrocalcitonin from mammalian thyroid glands where a mixture of aqueous acid and a water-miscible organic solvent is used to extract the hyrocalcitonin.

CROSS-REFERENCE

This application is a continuation-in-part of our copending application Ser. No. 619,910 filed Mar. 2, 1967, now abandoned.

BACKGROUND OF THE INVENTION

The existence of thyrocalcitonin was first postulated by Copp et al., Endocrinology 70, 638 (1962) and its existence was confirmed by Foster and co-workers in articles appearing in Lancet II 480 (1963), in Nature 202, 1303 (1964) and in other journals. Thyrocalcitonin is a single chain polypeptide and is a naturally occurring plasma-calcium-lowering hormone. Thyrocalcitonin has been used to treat patients suffering from disseminated malignant disease with severe hypercalcaemia, according to Foster et al., Lancet I 107 (1966). It is postulated that thyrocalcitonin is probably involved in certain clinical bone diseases and that there may be unrecognized syndromes caused by an excess or deficiency of the hormone.

Various methods of isolating thyrocalcitonin have been published, but these all suffer from serious deficiencies if the hormone is to be manufactured on a large scale. For example, the processes of Gudmundsson et al., Proc. Roy. Soc. 164, 460 (1966) and Baghdiantz et al., Nature 203, 1027 (1964) both require a dialysis step. Other purification processes which have been suggested in the prior are either involve multiple steps or produce a product of insufficient purity or both.

SUMMARY OF THE INVENTION

It is an object of this invention to provide a method of preparing thyrocalcitonin which is economical, adaptable for large scale operation, and which yields hormone of requisite purity for clinical use. Other objects of this invention will appear from the description which follows.

The novel process of this invention comprises the steps of extracting thyroid tissue with a mixture of an aqueous acid and a water-miscible organic solvent, separating the acidic extract, first preferentially precipitating inactive polypeptides and other proteinaceous materials and secondly precipitating crude thyrocalcitonin from the extract. The thyrocalcitonin is then further purified by chromatography. More specifically, the process provided by this invention is carried out as follows: Whole, or defatted desiccated mammalian thyroid, preferably pork or beef, is extracted using an acidified mixture of water and a water-miscible organic solvent as the extracting medium. The acidic extract is separated from the tissue residue and treated with a small volume of solvent to precipitate a large amount of hormonally inactive proteinaceous material which is separated by filtration and discarded. A larger volume of solvent is added to the filtrate to precipitate the thyrocalcitonin. Alternatively, a pH fractionation can be employed wherein the pH is adjusted to 6.5, the resulting precipitate of inactive proteinaceous material is discarded and a large volume of solvent added to precipitate the thyrocalcitonin. In either case, the precipitate is separated and purified by gel filtration or chromatography over a polydextran or other suitable absorbent. The product thus produced is homogeneous as shown by starch gel electrophoresis in 8 M (or molar) urea at a pH of 2.9. The purified homogeneous product has a significant serum calcium lowering activity in rats at doses approximating $1\gamma$ per kilo of body weight.

In the above process, the acidic extraction can be carried out using any strong acid; for example, hydrochloric, phosphoric, formic, acetic, sulfuric and the like. The amount of aqueous acid employed is such that the pH of the extraction mixture is below about 4; the preferred pH range being 1.5 to 3.5. While it is possible to use water alone as the solvent for this acidic extraction step, we have found that, with the use of a mixed solvent system including water and a water-miscible solvent such as dioxane, dimethylformamide, acetone, methanol, isopropanol, or ethanol. It is possible to greatly reduce the temperature of the extraction step. Ethanol is the preferred solvent, particularly for the extraction, and acetone is very effective in the precipitation. When aqueous acid alone is used as the extracting medium, the temperature necessary for efficient extraction of thyrocalcitonin is about 70° C., whereas, when acidic aqueous ethanol or acetone or similar mixture of aqueous acid and water-miscible organic solvent is used, the extraction temperature can be as low as 5° C. Under these latter extraction conditions, both the yield and purity of the thyrocalcitonin are clearly improved and any denaturation of protein is avoided. The range of permissible water-miscible organic solvent concentrations is from 25 percent to 85 percent by volume depending on the particular solvent chosen. We prefer to use ethanol in the useful range of 40–85 percent. At the higher water-miscible organic solvent concentrations, a greater amount of high molecular weight protein and other substances remain undissolved than at the lower end of the concentration range. Thus, these high molecular weight proteinaceous materials can be eliminated by filtration or centrifugation.

The second step of our process involves the differential precipitation of inactive proteinaceous materials. One method of effecting this precipitation is by the addition of a water-miscible organic solvent to the acidic extract. After these inactive materials have been precipitated and separated by filtration or centrifugation, additional water-miscible organic solvent is added in sufficient quantity to precipitate thyrocalcitonin. For example, 1–3 volumes of a water-miscible organic solvent are added to the acidic extract; the inactive proteinaceous materials which precipitate are separated by filtration and discarded. Then, additional solvent is added to the filtrate such that the total of solvent added is 5–10 volumes. This results in precipitation of the thyrocalcitonin which is in turn separated by filtration or centrifugation. The solvent used for precipitation may be, but need not necessarily be, the same solvent used for extraction.

In an alternative differential precipitation procedure, the pH of the original acidic extract is adjusted to about 6.5. Inactive proteinaceous material precipitates under these conditions and is separated by filtration. The solvent content of the filtrate is adjusted to at least 92 percent by the addition of more solvent. Crude thyrocalcitonin precipitates and is separated by centrifugation or filtration. This alternative process yields crude thyrocalcitonin which can be purified by gel filtration or similar process to yield purified thyrocalcitonin comparable to that obtained from the differential precipitation process employing only increasing volumes of the water-miscible organic solvent at acidic pH.

In the final step of the process wherein the thyrocalcitonin is recovered by gel filtration, or chromatography, we have specified that a polydextran (preferably Sephadex G–25F) be used as the gel filtration agent. However, it is possible to use other similar materials, such as polyacrylamide gels, as the adsorbent or filtration agent.

This invention is further illustrated by the following specific examples.

Example 1

One volume of frozen porcine thyroid is ground and then defatted by a threefold extraction employing ten volumes of acetone at $-10°$ C. for each extraction. The acetone extracts are separated by filtration and discarded. The residual tissue is further defatted by a threefold extraction using ten volumes of ether each time at 22–25° C. Again, the defatted tissue is separated by filtration and the ether extracts discarded.

One kilo of dried defatted thyroid tissue prepared as above is extracted with 20 liters of an acidic solvent prepared by mixing 2 liters of glacial acetic acid with 9 liters of water and adding sufficient 95 percent ethanol to make 20 liters. The extract is separated by filtration and the filtered material discarded. Thyrocalcitonin remains in the acidic filtrate. The filtrate is next mixed with 16 liters of acetone at $-5°$ C., filter-aid is added, the resulting mixture is filtered, and the filtered material discarded, thyrocalcitonin again remaining in solution in the filtrate. Nineteen liters of acetone at $-5°$ C. are added to the filtrate, filter-aid is again added, and the mixture refiltered. A third acetone precipitation of inactive materials is carried out by adding 17.3 liters of acetone at $-5°$ C., to the filtrate. In both of these steps, filter-aid is added, the mixture filtered and the insoluble material discarded. Thyrocalcitonin is still present in the filtrate. The filtrate is now mixed with 87.5 liters of acetone at $-5°$ C. The resulting mixture is allowed to remain overnight at 5° C., the supernate is decanted and discarded, and the remaining slurry, containing the precipitated thyrocalcitonin, is centrifuged. The thyrocalitonin-containing precipitate is washed with acetone and dried in vacuo, yielding 11.2 g. crude thyrocalcitonin. Two grams of this material are dissolved in 30 ml. of 1 N acetic acid, to which 1 ml. of 1 N hydrochloric acid is added to assist in dissolving the polypeptide material present. This solution is passed over a 4.7 x 48 cm. column of polydextran (Sephadex G–25F), using the same solution employed to dissolve the crude thyrocalcitonin as the eluant. Fractions of 8.5 ml. are collected. Fractions 45 to 56 containing purified thyrocalcitonin are combined and the combined fractions lyophilized. The yield of purified thyrocalcitonin is 15.3 mg. The yield of purified thyrocalcitonin per kilogram of dried, defatted thyroid glands is 85 mg./kg.

Example 2

One kilogram of whole frozen porcine thyroid glands are ground in a Fitzmill and the ground glands are added to 2600 ml. of 83 percent ethanol at 5° C. adjusted to pH=2.8 with phosphoric acid. The tissue slurry is stirred for one hour at 5° C. and the pH, which rises slightly, is again adjusted to 2.8 with phosphoric acid. The extraction mixture is stirred gently overnight at 5° C.

The mixture is filtered and the filtrate (2100 ml.) is saved as the first extract. The filtered tissue residue is again extracted with 2500 ml. of 65 percent ethanol, adjusted to pH=2.8, by stirring for one hour in the cold. The resulting mixture is filtered and the filtrate (2400 ml.) is combined with the first extract to give a total volume of crude extract of 4500 ml.

Sufficient 14 N ammonium hydroxide is added to the combined crude extracts to raise the pH to about 6.5. A red flocculent precipitate, which forms during the addition of the ammonium hydroxide, is removed by filtration and discarded. The pH of the filtrate is then adjusted to pH=8.2 by further addition of ammonium hydroxide. The white crystalline precipitate which forms during this process is separated by filtration and discarded.

The pH of the filtrate is now lowered to pH=6.5 by the addition of 6 N hydrochloric acid, and 3.4 volumes of absolute ethanol are added to increase the ethanol concentration to about 93 percent. A gross turbidity is present after addition of the ethanol, which turbidity settles after the mixture stands for two days in the cold. The clear supernatant fluid is separated by decantation, and the precipitate is collected by centrifugation. The precipitate is washed with absolute ethanol, and acetone and is then dried in vacuo. 8.08 grams of a light buff colored powder are obtained. This product administered intravenously at a dose level of 2.0 mg./kg. of rat body weight to a group of 6 Wistar rats causes a mean depression in serum calcium levels of 2.26±0.7 mg. percent as compared to a control group of rats injected with saline. The material can be further purified as in Example 1.

We claim:

1. A process of preparing thyrocalcitonin which comprises extracting mammalian thyroid tissue with an acidic mixture of water and a water-miscible organic solvent at a pH of less than about 4, adding 1–3 volumes of a water-miscible organic solvent to the extract to selectively precipitate inactive proteinaceous materials, separating said precipitate from the extract, adding additional water-miscible organic solvent to the extract such that the total of such solvent added is 5–10 volumes to precipitate thyrocalcitonin, and separating and purifying the thyrocalcitonin, said water-miscible organic solvent being dioxane, dimethylformamide, acetone, methanol, isopropanol, or ethanol.

2. A process as in claim 1 wherein the solvent is ethanol.

3. A process as in claim 2 wherein the extraction is conducted at a pH of 1.5 to 3.5.

4. A process of preparing thyrocalcitonin which comprises extracting mammalian thyroid tissue with an acidic mixture of water and a water-miscible organic solvent at a pH of less than about 4, adjusting the pH of the extract to about 6.5 to selectively precipitate inactive proteinaceous material, separating said precipitate from the extract, adding a water-miscible organic solvent to adjust the solvent concentration to at least 92 percent to precipitate thyrocalcitonin, and separating and purifying the thyrocalcitonin, said water-miscible organic solvent being dioxane, dimethylformamide, acetone, methanol, isopropanol, or ethanol.

5. A process as in claim 4 wherein the solvent is ethanol.

6. A process as in claim 5 wherein the extraction is conducted at a pH of 1.5 to 3.5.

References Cited

UNITED STATES PATENTS 3,256,151   6/1966   Copp et al. _____ 424—112

OTHER REFERENCES

Journal of American Chemical Society, vol. 81, 1959, p. 5003, Rasmussen et al.

Journal of Biological Chemistry, vol. 235, 1960, pp. 3442–3447, Rasmussen.

Journal of Biological Chemistry, vol. 236, April 1961, pp. 1083–1086, Rasmussen et al.

(Other references on following page)

OTHER REFERENCES

Biochimica et Biophysica Acta, vol. 56, 1962, pp. 332–338, Rasmussen et al.

Journal of Biological Chemistry, vol. 239, 1964, pp. 2852–2857, Rasmussen et al.

Proceedings of the National Academy of Science (U.S.) 53, p. 818–822, 1965, Tenenhouse et al.

Federation Proceedings, vol. 26, Number 2, March–April 1967, p. 392, Hawker et al.

Ann. Rev. of Pharmacology, vol. 8, 1968, p. 323 (MacIntyre).

WILLIAM H. SHORT, Primary Examiner

H. SCHAIN, Assistant Examiner

U.S. Cl. X.R.

260—112.5; 424—111, 177